Patented Mar. 20, 1951

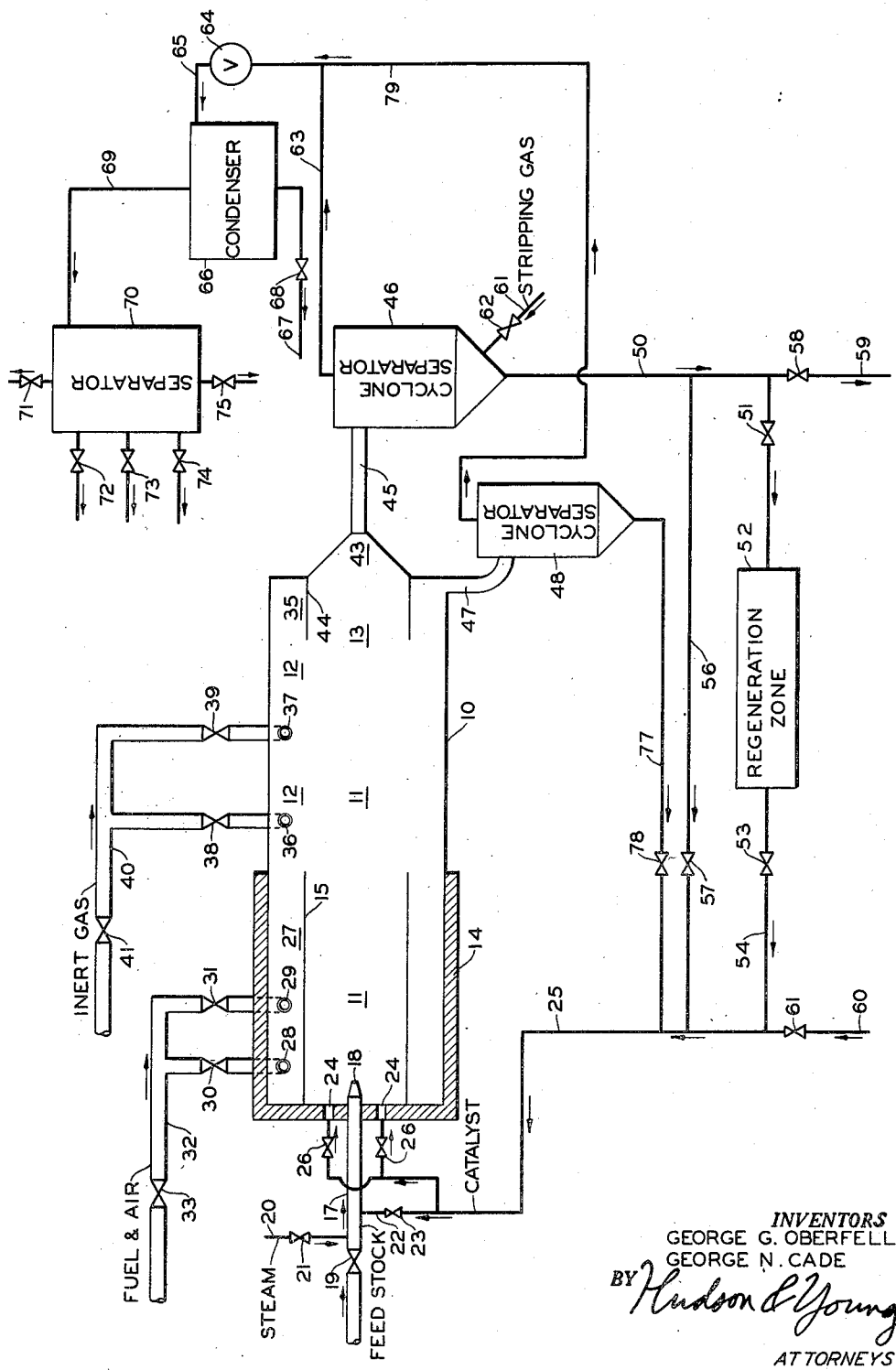

2,546,042

UNITED STATES PATENT OFFICE 2,546,042

PROCESS AND APPARATUS FOR CATALYTIC CONVERSION OF HYDROCARBONS

George Grover Oberfell and George N. Cade, Bartlesville, Okla., assignors to Phillips Petroleum Company, a corporation of Delaware Application December 31, 1948, Serial No. 68,464

12 Claims. (Cl. 196—52)

This invention relates to a method of and apparatus for catalytically converting hydrocarbons. In a more specific aspect, it relates to a method of and apparatus for catalytic cracking of gas oil stocks.

In accordance with our invention, hydrocarbons are catalytically converted in an elongated reaction vessel in which fuel gases flow in a spiral path around an axially moving hydrocarbon stream containing a finely divided catalyst, thereby to heat such hydrocarbon stream to conversion temperature. A stream of inert gases is introduced tangentially into the spirally moving fuel gas stream as it passes from the conversion zone to a regeneration zone, thereby to cool the fuel gas stream to regeneration temperature. In the regeneration zone, a major portion of the catalyst in the feed stream is forced into the outer spirally moving gas stream by centrifugal action and regenerated. This regenerated catalyst, together with most of the fuel gases, and a minor portion of converted hydrocarbons, are removed from the peripheral regions of the reactor, while a major portion of the converted hydrocarbons and a minor portion of fuel gases and unregenerated catalyst are removed from the central region of the reactor. The unregenerated catalyst is passed through a regeneration zone and recycled together with the regenerated catalyst withdrawn from the peripheral regions of the reactor. The gaseous effluent from the reactor, consisting of a mixture of fuel gases and converted hydrocarbons, is separated in any suitable manner for product recovery.

The method and apparatus of this invention are particularly applicable to endothermic catalytic conversion of hydrocarbons, such as catalytic cracking and catalytic dehydrogenation, but they also find application in other types of catalytic reactions, such as hydroforming, isomerization, polymerization, and alkylation of hydrocarbon feed stocks. The novel apparatus and method of the present invention permit the conversion reactions to be conducted at high throughput while the tangential introduction of the fuel gases provides highly efficient heat transfer between the fuel gases and the hydrocarbon stream to be converted.

It is an object of our invention to provide an improved method of and apparatus for catalytically converting hydrocarbons.

It is a further object of our invention to effect such catalytic hydrocarbon conversions at high throughput and with very efficient heat transfer in endothermic reactions.

It is a further object of our invention to provide a method of and apparatus for effecting catalytic conversion and catalyst regeneration in a single reaction vessel.

Various other objects, advantages and features of our invention will become apparent to those skilled in the art from the following description, taken in conjunction with the accompanying drawing, in which the figure is a flow diagram of a typical catalytic cracking system in which our novel reactor is shown in vertical section.

Referring now to the drawing in detail, we have shown a cylindrical reactor 10, preferably formed from steel, of the type utilized in the manufacture of carbon black. The interior of the vessel is divided into a conversion zone, generally indicated by reference character 11, a regeneration zone, generally indicated by reference numeral 12, and a separation or withdrawal zone, generally indicated by reference numeral 13. The vessel 10 is provided with a shell or lagging 14 of refractory heat insulating material, such as magnesia or asbestos, which is disposed about the conversion zone 11. A tube or sheath 15 of a heat exchange material, such as steel, is disposed within the conversion zone 11 and is secured, in any suitable manner, to the adjacent end of the vessel 10. Preferably, this tube is cylindrical and is disposed concentrically with respect to the cylindrical portion of the reaction vessel. This tube permits efficient heat transfer between an axially moving feed stream and tangentially introduced fuel gases while preventing intermingling of these two streams within the conversion zone.

Feed stock is introduced interiorly of the tube 15 through a conduit 17 terminating in a nozzle 18. The hydrocarbon portion of the feed stock to be converted is fed to conduit 17 through a valve 19; steam may be admitted to conduit 17 through a line 20 controlled by a valve 21; and suspended finely divided catalyst may be introduced into conduit 17 through a line 22 controlled by a valve 23. Alternatively, the catalyst may be introduced interiorly of the tube 15 through manifolds 24 by a line 25 and valves 26. Preferably, the manifolds are arranged symmetrically with respect to the axial conduit 17 through which the feed stock is introduced.

In accordance with the invention, a large variety of feed stocks may be introduced by conduit 17 for catalytic conversion within the reactor 10. A preferred feed stock consists of a 400 to 750° F. gas oil, in which case the catalyst may be any highly active finely divided material such as silica-alumina, or silica-zirconia. The catalyst particles may have a size of 100 to 300 mesh, and the catalyst to feed ratio may vary between 1 to 20 pounds of catalyst per gallon of oil. The same type of catalyst may also be used for catalytic cracking of other hydrocarbon feed stocks, such as naphtha, light hydrocarbons, or kerosene stocks. The present invention is also applicable to the reforming of gasoline, and to the alkylation of aromatic compounds, such as benzene, by olefins, such as ethylene, in which case the catalyst may be cadmium pyrophosphate. In the polymerization of olefins, such as ethylene, the catalyst may consist of phosphoric acid suspended on a silica or kieselguhr. In the catalytic hydrogenation of olefins to form paraffins, the catalyst employed may be nickel or cobalt on silica or silica-alumina.

As will be apparent from the drawing, the finely divided or fluid catalyst may be suspended in a vaporous or liquid hydrocarbon feed of the character described by introducing catalyst into the conduit 17 through valve 23. Alternatively, at least part of the catalyst may be separately charged to the conversion zone 11 through valves 26 and manifolds 24. Steam may be added, if desired, through line 20 and valve 21 to facilitate vaporization of the feed stock before it is introduced into the reaction vessel.

It will be apparent that the feed stock introduced into the vessel in the manner described travels axially through the conversion zone 11 and the regeneration zone 12 to the separation zone 13.

In accordance with the invention, fuel gas is charged into the annular zone 27 between tube 15 and the vessel 10 through tangentially directed inlets 28 and 29 which are connected, respectively, through valves 30, 31 to a common supply conduit 32 which is controlled by a valve 33. In the embodiment shown, we have provided two such inlets axially spaced from each other but we may utilize any desired number within wide limits and they may be spaced at intervals around the circumference of the vessel, if desired, provided that all inlets are directed so as to provide concurrent flow of the several gas streams. The fuel gas consists of a mixture of a fuel, such as natural gas, and air in proportions to be later described. It will be apparent that the stream of fuel gases travels in a generally spiral path about the peripheral region of the reaction vessel, passing successively through the combustion zone 27, the regeneration zone 12, and a peripheral region 35 of the separation zone 13.

The combustion of the fuel gases entering the reactor releases sufficient heat to provide a temperature of 800 to 1050° F. within the conversion zone for catalytic cracking reaction of gas oil feed stocks. Combustion of the fuel gas within the annular zone 27 produces a spirally moving flame about the tube 15 and, by the efficient heat transfer through this tube, the feed stock within zone 11 is heated to conversion temperature. The proportion of air or oxygen in the fuel stream should be sufficient to cause complete combustion of the fuel gas to carbon dioxide and water, and to produce an uncombined oxygen content of about 1 to 20 volume per cent in the combustion product gases passing from the annular zone 27 into regeneration zone 12.

In this manner, the hydrocarbon feed stock is converted within zone 11, and the effluent from this zone, therefore, consists of converted hydrocarbons and spent catalyst having a deposit of carbon thereon. In the regeneration zone 12, a major portion of the spent catalyst is forced into the peripheral region of the chamber as a result of the helical motion of the fuel gases passing from annular zone 27. In accordance with the invention, a cool inert gas or diluent, such as nitrogen, is added tangentially to the reactor through inlets 36, 37 which are connected, respectively, through valves 38, 39 to a supply conduit 40 controlled by a valve 41. These cool inert gases are added to the spirally moving combustion gas stream in a sufficient proportion as to cool this stream to a catalyst regeneration temperature within the range of 950 to 1150° F. Accordingly, a portion of the spent catalyst is regenerated in the zone 12 and passes in a spiral path to region 35 of the separation zone, along with a major portion of the inert gases and combustion gases, and a minor portion of the converted hydrocarbons.

The bulk of the converted hydrocarbons passes axially through the regeneration zone to a central region 43 of withdrawal zone 13. The converted hydrocarbon stream passing into the region 43 also contains a portion of spent or unregenerated catalyst together with a minor portion of the fuel and inert gases tangentially charged to the reactor. The regions 35, 43 of withdrawal zone 13 are separated by a cylindrical baffle or guide 44 which collects the fluid from the central region of the vessel, and this effluent is withdrawn through a conduit 45 and passed to a separator 46, such as a cyclone separator. The effluent from the peripheral region 35 is withdrawn through a conduit 47 and charged to a second separator 48.

The pressure within the reaction vessel may vary within wide limits depending on the nature of the stock to be converted and the other reaction conditions. In general, the pressures used vary from 15 to 500 pounds per square inch. The reaction time within conversion zone 11 may also be varied within wide limits by changing the length of the reaction zone and the velocity with which the reactants are introduced. In general, this reaction time may vary from 0.001 second to one minute. The velocity of the gases and length of regeneration zone 12 are controlled so that the regeneration time is sufficient to remove from 50 to 90 per cent of the carbon from the spent catalyst. This oxidation of carbon deposited on the catalyst is effected by the residual oxygen contained in the combustion gas stream passing into the regeneration zone 12. If necessary, the oxygen content of the regeneration gases may be increased to any desired value, for example 0.5 to 5 per cent, by adding additional oxygen with the inert gas introduced through inlets 36 and 37. Additional cooling of the fuel gases within the conversion zone may be effected by withdrawing heat through the walls of the reaction vessel at the regeneration zone 12. It will be noted that this region of the vessel is surrounded by thinner heat insulating material, or in some cases almost none, and, accordingly, at least a portion of the heat produced by the exothermic regeneration reaction may be withdrawn and utilized, for example, by disposing heat exchange coils around the exterior of the vessel so that the heat from the regeneration reaction is utilized to raise the temperature of a gas or liquid stream at some other part of the process. Specifically, this heat exchange system may be used to preheat the charge stock introduced through conduit 17.

The effluent passing into separator 46 consists, as previously stated, of a major portion of converted hydrocarbons, a minor portion of fuel and inert gases, and a minor portion of unregenerated catalyst. It will be understood that the converted hydrocarbons just referred to include the compounds in the feed stock which are not converted in the reaction zone 11. In separator 46, the solid catalyst particles and gases are separated, the catalyst passing through a line 50, valve 51, regeneration zone 52, valve 53, and line 54 to recycle line 25. The spent catalyst passing from the separator 46 is thus regenerated and recycled. In some cases, where a substantial quantity of regenerated catalyst is recycled from separator 48, it is not necessary that the minor portion of catalyst separated in the unit 46 be regenerated. Thus, for example, when a minor portion of this spent catalyst is mixed with a major portion of regenerated catalyst, the overall carbon content of the mixture may be sufficiently low as to permit efficient conversion in the zone 11. In this case, the catalyst separated in unit 46 is passed directly to recycle line 25 through a line 56 and a valve 57. If desired, spent catalyst from the unit 50 may be directly withdrawn through valve 58 and outlet 59 while fresh catalyst may be admitted through inlet 60 and valve 61 to replace losses due to fines leaving the system with the product gases.

In some cases, it is desirable to feed a stripping gas, such as steam to the separator 46. To this end, an inlet 61 is provided for the stripping gas which passes into the separator through a valve 62. Accordingly, the gaseous product from the separator 46 consists of a major portion of converted hydrocarbons, a minor portion of fuel and inert gases, and steam which may be admitted to the system either through valve 62 or through valve 21 at the inlet to reactor 10. This gaseous mixture is charged through a line 63, an automatic control valve 64 and a line 65 to a condenser 66 in which the steam is condensed and removed as a liquid phase through line 67 and valve 68. The product from the condenser 66, consisting of converted hydrocarbons, combustion gases and inert gases is charged through a line 69 to a separation zone 70. In this separation zone, the hydrocarbon containing mixture is separated into an overhead product consisting of methane, nitrogen, hydrogen, and other light gases which is withdrawn through a valved outlet 71. Light hydrocarbons, such as those containing 3 and 4 carbon atoms, are withdrawn through valved outlet 72; a gasoline fraction is withdrawn through valved outlet 73; and a gas oil fraction is withdrawn through valved outlet 74 for recycling to the feed conduit 17. The bottoms product from separation zone 70, which is withdrawn through valved outlet 75, consists of heavy residual products.

The effluent charged to separation unit 48 consists, as stated, of a major portion of regenerated catalyst, a minor portion of converted hydrocarbons, and the major portion of the fuel and inert gases. In the separator 48, the finely divided regenerated catalyst is withdrawn through a line 77 and a valve 78 for passage to the recycle conduit 25. The gas from the separation unit 48, consisting primarily of fuel and inert gases with some converted hydrocarbons, is passed through a line 79 to valve 64, condenser 66, and separating zone 70 where it is separated into its components in the manner previously described in connection with the gaseous product from separator 46.

In the overall operation of the system, it will be noted that a stream of hydrocarbon feed stock containing suspended, finely divided catalyst is passed in an axial path into conversion zone 11, where it is raised to conversion temperature by heat exchange with hot combustion gases through tube 15, which prevents intermingling of the feed stream and combustion gases in the conversion zone. Hydrocarbons are thus converted catalytically and passed into regeneration zone 12 where some intermingling between the combustion gases and converted hydrocarbon stream occurs. In this zone, a major portion of the catalyst moves to the periphery of the vessel into contact with the combustion gases, a coolant being added through inlets 36 and 37 to reduce the temperature of the fuel gases to regeneration temperature. In this manner, the major portion of the catalyst is regenerated through removal of carbonaceous deposits therefrom and this regenerated catalyst, together with the fuel and inert gases, passes through region 35 of separation zone 13 and is fed to separator 48. The converted hydrocarbons, together with a minor portion of unregenerated catalyst and a minor portion of fuel and inert gases pass through the central region 43 of separation zone 13 to the separator 46. The separators 46 and 48, the condenser 66, and the separation zone 70 are so connected as to separate and recycle the catalyst, and separate the converted hydrocarbons, fuel gases, and inert gases into their respective components. The tangential flame in the zone 27 transfers its heat very effectively through the tube 15 and the spiral motion of the fuel gases and inert gases provide a swirling motion and turbulence of the gases in the regeneration zone so that the carbonaceous deposits are rapidly burned off the hydrocarbon particles.

It will be noted that the outside of the reactor around the cracking zone is insulated, whereas that around the regeneration zone is less insulated or free from insulation. This arrangement is in accordance with the facts that the cracking reaction is endothermic, and the regeneration is exothermic. Part of the heat produced by the exothermic regeneration reaction is intentionally lost through the reactor walls surrounding regeneration zone 12, and another part of this heat may effect some additional cracking or reforming in the central region of the regeneration zone.

It will be apparent that reactor 2 need not be absolutely cylindrical. In fact, it may advantageously be conical or exponentially flared with increasing cross-sectional area in the direction of flow. This design provides increased control of flow velocity, which may be increased in some cases by the addition of inert gas through manifolds 36 and 37.

As a specific example, a cracking stock, such as a 400–750° F. virgin gas oil enters reactor 10 through inlet 19. The gas oil may be vaporized before it enters conduit 17 by any suitable means, not shown, or it may be preheated to any desired temperature, for example, by heat exchange through the vessel at regeneration zone 12, and vaporized by heat stored in the catalyst or by the addition of steam or other heat carrier, which enters through inlet 20. Alternatively, the catalyst may be mixed with the liquid feed and the mixture atomized into reactor 10, in which the feed is rapidly vaporized. Finely divided silica-zirconia cracking catalyst having a particle size of 100 to 300 mesh enters the reactor through inlet 18 or manifolds 24. The mixture of oil vapor and suspended catalyst passes through sheath 15 and a fuel gas consisting of a mixture of natural gas and oxygen enters reactor 10 tangentially through manifolds 28, 29 and produces a helically traveling flame around sheath 15. The proportion of oxygen entering through manifolds 28, 29 is sufficient to effect complete combustion of the fuel gas to carbon dioxide and water and to produce a helically traveling combustion-product gas containing about 1 to 20 volume per cent uncombined oxygen. The helical flame around sheath 15 rapidly and efficiently heats the gas oil-catalyst mixture to a cracking temperature within the range of 850 to 1050° F. The ratio of fuel-air mixture to gas oil-catalyst mixture is easily regulated to obtain such a temperature inside sheath 15.

When the catalyst suspended in hydrocarbon vapor emerges from the open end of sheath 15, the major part of the catalyst is thrown toward the walls of reactor 10 and into the combustion gases traveling helically along the reactor walls. This action is a result of the helical motion of the gases in the reactor. Sufficient nitrogen is added tangentially through manifolds 36, 37 to cool the peripheral gases to a regeneration temperature within the range of 950 to 1150° F. This cooling is rapidly effected by virtue of the swirling motion and high turbulence of the gases. The catalyst passing into the peripheral gases is rapidly regenerated by the free oxygen, which burns off carbonaceous deposits. The oxygen content of the peripheral gases may be further adjusted to any desired value, for example 0.5 to 5 per cent, by adding supplemental oxygen with the inert gas through manifolds 36, 37. The catalyst is regenerated and recycled in the manner previously described, and products consisting of light gases, a C₃ and C₄ light hydrocarbon fraction, a gasoline fraction, a recycle gas oil fraction, and a heavy residual fraction are withdrawn through the respective outlets of separation zone 70.

While the invention has been described in connection with a present, preferred embodiment thereof, it is to be understood that this description is illustrative only and is not intended to limit the invention, the scope of which is defined by the appended claims.

Having described our invention, we claim:

1. In the art of catalytically converting hydrocarbons, the steps which comprise passing a stream of hydrocarbon feed stock containing suspended, finely divided catalyst into a conversion zone and then into a regeneration zone, passing a stream of hot regeneration gases in a helical path around the hydrocarbon stream in said conversion zone and in heat exchange relation therewith, thereby to heat said hydrocarbon stream to conversion temperature, cooling said gases to regeneration temperature as they pass from the conversion zone into the regeneration zone, withdrawing converted hydrocarbons and unregenerated catalyst from the central region of the regeneration zone, and withdrawing converted hydrocarbons and regenerated catalyst from the peripheral region of the regeneration zone.

2. In the art of catalytically converting hydrocarbons, the steps which comprise passing a stream of hydrocarbon feed stock containing suspended, finely divided catalyst into a conversion zone and then into a regeneration zone, passing a stream of hot regeneration gases in a helical path around the hydrocarbon stream in said conversion zone and in heat exchange relation therewith while preventing contact between the hydrocarbon stream and the gas stream, thereby to heat said hydrocarbon stream to conversion temperature, cooling the helically-moving gases to regeneration temperature as they pass from the conversion zone to the regeneration zone while permitting intermingling of the hydrocarbon stream and the gas stream, withdrawing converted hydrocarbons and unregenerated catalyst from the central region of the regeneration zone, and withdrawing regenerated catalyst from the peripheral region of the regeneration zone.

3. In the art of catalytically converting hydrocarbons, the steps which comprise passing a stream of hydrocarbon feed stock containing suspended, finely divided catalyst into a conversion zone and then into a regeneration zone, passing a stream of hot flaming regeneration gases in a helical path around the hydrocarbon stream in said conversion zone and in heat exchange relation therewith while preventing intermingling of the feed stock and gas stream, thereby to heat said feed stock to conversion temperature, passing the helically-moving stream of gases into the regeneration zone while permitting catalyst to pass from the feed stock into the combustion gas stream, introducing a stream of inert gas into the regeneration zone in tangential relation to the helically-moving stream of combustion gases to cool it to regeneration temperature, withdrawing converted hydrocarbons and unregenerated catalyst from the central region of the regeneration zone, and withdrawing converted hydrocarbons and regenerated catalyst from the peripheral region of the regeneration zone.

4. In the art of catalytically converting hydrocarbons, the steps which comprise passing a stream of hydrocarbon feed stock containing suspended, finely divided catalyst successively into a conversion zone, a regeneration zone, and a separation zone, passing a stream of hot regeneration gases in a helical path through said conversion zone, said regeneration zone, and said separation zone while preventing intermingling of the feed stock and gases in the conversion zone but permitting passage of catalyst from the feed stream to the regeneration gas stream in the regeneration zone, introducing a stream of inert gas into the regeneration zone in tangential relation to the stream of hot gases, thereby to cool said regeneration zone to regeneration temperature, withdrawing converted hydrocarbons and unregenerated catalyst from the central region of the separation zone, and removing converted hydrocarbons and regenerated catalyst from the peripheral region of the separation zone.

5. In the art of catalytically converting hydrocarbons, the steps which comprise effecting helical movement of a stream of hot regeneration gases through a conversion zone and a regeneration zone, passing a stream of hydrocarbon feed stock containing suspended, finely divided catalyst in an axial path through said zones while preventing intermingling of the two streams in the conversion zone but permitting catalyst to pass from the feed stream to the gas stream in the regeneration zone, removing heat from the gases in the regeneration zone whereby said zone is cooled to regeneration temperature, withdrawing converted hydrocarbons and unregenerated catalyst from the central region of the regeneration zone, and withdrawing converted hydrocarbons and regenerated catalyst from the peripheral region of the regeneration zone.

6. In the art of catalytically converting hydrocarbons, the steps which comprise passing a stream of hydrocarbon feed stock into a conversion zone and then into a regeneration zone, introducing finely divided catalyst into the conversion zone, passing a stream of hot flaming regeneration gases in a helical path around the hydrocarbon stream in said conversion zone and in heat exchange relation therewith, thereby to heat said hydrocarbon stream to conversion temperature, cooling the regeneration gases to regeneration temperature as they pass from the conversion zone into the regeneration zone, withdrawing converted hydrocarbons and unregenerated catalyst from the central region of the regeneration zone, and withdrawing converted hydrocarbons and regenerated catalyst from the peripheral region of the regeneration zone.

7. In the art of catalytically converting hydrocarbons, the steps which comprise passing a stream of hydrocarbon feed stock into a conversion zone and then into a regeneration zone, introducing finely divided catalyst into the conversion zone, passing a stream of hot flaming regeneration gases in a helical path around the hydrocarbon stream in said conversion zone and in heat exchange relation therewith, thereby to heat said hydrocarbon stream to conversion temperature, cooling the regeneration gases to regeneration temperature as they pass from the conversion zone into the regeneration zone, withdrawing converted hydrocarbons and unregenerated catalyst from the central region of the regeneration zone, withdrawing converted hydrocarbons and regenerated catalyst from the peripheral region of the regeneration zone, separating converted hydrocarbons from the regenerated catalyst, recycling the regenerated catalyst, separating converted hydrocarbons and unregenerated catalyst, revitalizing the unregenerated catalyst, and recycling the revitalized catalyst.

8. In the art of catalytically cracking a feed stock, the steps which comprise passing a stream of hydrocarbon cracking stock containing a suspended, finely divided catalyst into a cracking zone and then into a regeneration zone, passing a stream of hot combustion gases containing oxygen in a helical path around the hydrocarbon stream in said cracking zone and in heat exchange relation therewith, thereby to heat said hydrocarbon stream to a cracking temperature within the range of 800 to 1050° F., tangentially introducing a diluent stream into the combustion gas stream as it passes from the cracking zone to the regeneration zone to cool said combustion gases to a regeneration temperature within the range of 950 to 1150° F., thereby to burn carbonaceous deposits from the catalyst in said regeneration zone, withdrawing cracked hydrocarbons and unregenerated catalyst from the central region of the regeneration zone, and withdrawing regenerated catalyst from the peripheral region of the regeneration zone.

9. In the art of catalytically cracking hydrocarbons, the steps which comprise passing a stream of gas oil having a boiling range of 400° to 750° F. containing suspended, finely divided cracking catalyst into a cracking zone and then into a regeneration zone, passing a stream of hot combustion gases containing oxygen in a helical path around the gas oil stream in said cracking zone and in heat exchange relation therewith to raise the gas oil to a cracking temperature within the range of 800° to 1050° F., maintaining a pressure of 15 to 500 pounds per square inch in the cracking and regeneration zones, regulating the velocity of the gas oil stream to provide a cracking time of from .001 second to 1 minute, cooling the helically-moving combustion gases to a temperature of 950 to 1150° F. as they pass from the conversion zone to the regeneration zone while permitting intermingling of the gas oil stream and the combustion gas stream, thereby to remove carbonaceous deposits from the catalyst particles, withdrawing cracked hydrocarbons and unregenerated catalyst from the central region of the regeneration zone, and withdrawing cracked hydrocarbons and regenerated catalyst from the peripheral region of the regeneration zone.

10. In the art of catalytically cracking hydrocarbons, the steps which comprise passing a stream of gas oil having a boiling range of 400 to 750° F. containing suspended, finely divided silica-zirconia catalyst into a cracking zone and then into a regeneration zone, passing a stream of hot combustion gases in a helical path around the gas oil stream in said cracking zone and in heat exchange relation therewith to raise the gas oil to a cracking temperature within the range of 800 to 1050° F., maintaining a pressure of 15 to 500 pounds per square inch in the cracking and regeneration zones, regulating the velocity of the gas oil stream to provide a cracking time of from .001 second to 1 minute, introducing a tangential stream of nitrogen into the region surrounding the conversion zone concurrently with the helically-moving combustion gases to cool said combustion gases to a conversion temperature within the range of 950 to 1150° F., introducing sufficient oxygen with the nitrogen to maintain an oxygen content of from .5 to 5 per cent in the gases at the periphery of the regeneration zone, withdrawing converted hydrocarbons and unregenerated catalyst from the central region of the regeneration zone, and withdrawing regenerated catalyst from the peripheral region of the regenerated zone.

11. A reactor for use in the catalytic conversion of hydrocarbons which comprises, in combination, an elongated generally cylindrical vessel, a tube of heat exchange material disposed within said vessel and secured to one end thereof, a conduit for introducing feed stock through said end of the vessel to the interior of said tube, a tangentially disposed pipe for introducing hot gases into the interspace between said tube and said vessel, heat insulating material covering the exterior of said vessel at said one end thereof, a tangential pipe extending into the central region of said vessel and spaced from said tube and said heat insulating material, an enlarged outlet disposed at the other end of said vessel having an inwardly-protruding guide portion for collecting gases from the central region of said vessel, and an outlet for collecting gases from the interspace between said vessel and said guide member.

12. A reactor for use in the catalytic conversion of hydrocarbons which comprises, in combination, an elongated generally cylindrical vessel, a tube of heat exchange material disposed within said vessel and secured to one end thereof, a conduit for introducing feed stock through said end of the vessel into said tube, a series of openings in said end of the vessel disposed circumferentially around said conduit and communicating with the interior of said tube, said openings being adapted for the introduction of finely divided catalyst into said tube, a tangentially disposed pipe for introducing combustion gases into the interspace between said tube and said vessel, heat insulating material covering the exterior of said vessel at said one end thereof, a tangential pipe extending into the central region of said vessel and spaced from said tube and said heat insulating material, an enlarged outlet disposed at the other end of said vessel having an inwardly-protruding guide portion for collecting gases from the central region of said vessel, and an outlet for collecting gases from the interspace between said vessel and said guide member.

GEORGE GROVER OBERFELL.
GEORGE N. CADE.

REFERENCES CITED

The following references are of record in the file of this patent:

UNITED STATES PATENTS

| Number | Name | Date |
|---|---|---|
| 1,856,801 | Atwell | May 3, 1932 |
| 1,928,494 | Irwin et al. | Sept. 26, 1933 |
| 1,990,697 | Keeling | Feb. 12, 1938 |